(12) United States Patent
Wang

(10) Patent No.: US 6,505,439 B2
(45) Date of Patent: Jan. 14, 2003

(54) PROCESS FOR PRODUCING NATURAL ORGANIC TRACE ELEMENT RICH NUTRITIONAL SUPPLEMENTS

(76) Inventor: Jiangke Wang, 23610 Chandelle Pl., Diamond Bar, CA (US) 91765

( * ) Notice: Subject to any disclaimer, the term of this patent is extended or adjusted under 35 U.S.C. 154(b) by 0 days.

(21) Appl. No.: 09/795,406

(22) Filed: Feb. 28, 2001

(65) Prior Publication Data

US 2001/0007687 A1 Jul. 12, 2001

(51) Int. Cl.$^7$ ................................................. A01C 1/00
(52) U.S. Cl. ......................................................... 47/61
(58) Field of Search ........................... 47/61, 59 R, 60; 71/77, 27; 75/710; 426/74

(56) References Cited

U.S. PATENT DOCUMENTS 3,873,296 A * 3/1975 Ashmead et al. ........... 504/190
5,364,451 A * 11/1994 Raskin et al. ............... 210/602
5,993,504 A * 11/1999 Nonomura et al. ............ 71/11
6,117,462 A * 9/2000 Ensley et al. ............... 426/615

* cited by examiner

Primary Examiner—Robert P. Swiatek
Assistant Examiner—Bethany L. Griles

(57) ABSTRACT

A process for producing nutritional supplements rich in natural organic trace elements using soilless culture of plant sprouts and seedlings. The primary advantage of this invention is that the enriched trace element content in the sprouts and seedlings is mainly in organic form, which is the result of the natural organic conversion of these trace elements from their inorganic form during seed germination. Such form of natural organic trace element is non-toxic and much easier for the human body to digest and absorb. Further, the trace element content in the sprouts and seedlings can be effectively controlled.

9 Claims, No Drawings

PROCESS FOR PRODUCING NATURAL ORGANIC TRACE ELEMENT RICH NUTRITIONAL SUPPLEMENTS

CROSS-REFERENCE TO RELATED APPLICATIONS

The present invention is related to but not dependent of the following foreign patent applications: Foreign Patent Documents (application number, filing date, publish date, country code):

| | | | |
|---|---|---|---|
| 99116298.6 | 7/20/1999 | 03/22/2000 | CN. |
| 99117294.9 | 12/17/1999 | 07/26/2000 | CN. |
| 99117295.7 | 12/17/1999 | 07/26/2000 | CN. |
| 99124691.8 | 12/30/1999 | 08/23/2000 | CN. |

BACKGROUND OF THE INVENTION

The present invention concerns a process for producing nutritional supplements rich in organic trace elements using soilless culture of plant sprouts and seedlings. In particular, the process of this invention uses the plant's own natural ability to convert inorganic trace elements into organic form, producing a superior type of organic nutritional supplements.

The primary source of food and nutrition for human comes from agriculture products. However, for a very long time, the agricultural research and development mainly focus on refining traditional agriculture techniques with modern technologies such as fertilizer and genetic engineering. Too often the goal of these developments is simply to increase production while ignoring the nutritional quality of the products. Abundant studies have shown that agriculture products produced with these technologies lack sufficient trace elements the human body needs or may benefit from such as iron, zinc, copper, selenium, chromium, iodine and germanium. At the same time, modern medical and biological researches have highlighted the significant physiological effect of trace elements on human health, which led to a new breed of nutritional supplement products that contain trace elements.

Currently, the use of trace elements in nutritional supplements can be categorized into four types: 1) inorganic salt such as $ZnSO_4$ and $FeSO_4$; 2) simple organic compound such as $FeC_6O_8H_7$ and $ZnC_6H_{12}O_7$; 3) organic complex compound such as trace element amino acid compound; 4) natural organic form trace element such as zinc enriched brewers dried yeast. The disadvantages of the first two types of supplements include: low dosage use cannot satisfy human nutritional need, toxic when used in high dosage, prone to oxidation, hygroscopicity and precipitation in a mixture of different salts and/or compounds. While the last two types of supplements overcome the disadvantages of the first two, they often require complex and expensive laboratory and industrial process to manufacture.

The concept of this invention is based on the studies of biogeochemistry and the new discipline of agricultural biogeochemistry pioneered by the inventor in China, which calls for the research and development of new agriculture products rich in trace elements essential to human health. The goal of this invention is to provide a new method to produce natural organic form trace element nutritional supplements that solves the problems of various current technologies mentioned above. Specifically, its process shall be simple, non-toxic, inexpensive and suitable for a wide range of application environment from common household to large-scale manufacture.

BRIEF SUMMARY OF THE INVENTION

The present invention provides a process for producing nutritional supplements rich in organic trace elements essential to human health using soilless culture of plant sprouts and seedlings. The process of this invention uses a certain concentration range of the inorganic salt solution of the target trace element(s) to saturate the selected plant seeds. The saturated seeds are moved to a soilless culture environment to germinate. The sprouts are then rinsed, peeled, steamed, dried, ground and packaged for use as nutritional supplements or other food and drug manufacture additive. In addition, the young seedlings can be used directly as vegetable. The primary advantage of this invention is the enriched trace element content, such as iron, selenium, germanium, zinc and chromium, in the sprouts and seedlings is mainly in organic form, which is the result of the natural organic conversion of these trace elements from their inorganic form during the germination. Such form of organic trace element is non-toxic and much easier for the human body to digest and absorb. Further, the trace element concentration in the sprouts and seedlings can be effectively controlled.

DETAILED DESCRIPTION OF THE INVENTION

The present invention provides a process for producing nutritional supplements rich in organic trace elements using soilless culture of plant sprouts and seedlings, comprising the following steps:

a) In room temperature of 20° C. to 28° C., completely submerge the selected seeds in the inorganic salt solution of the target trace element(s) for 4 to 6 hours depending on the type of seed used and the temperature. For every 100 g seeds, use 120 ml solution. The goal is to saturate the seeds with the inorganic trace element solution in preparation for the germination process.

b) Transfer the seeds from the saturation container to soilless culture devices and use tap water or purified water as initial moisture. Then place the populated devices into a darkened and 20° C. to 28° C. temperature controlled culture container or room to allow the seeds to sprout and grow. Spray the same seed saturation solution onto the sprouts and seedlings twice a day to replenish moisture.

c) Allow the seeds to sprout to 1 to 1.5 cm in height. This is often equal to 1 to 3 days of culture in the said environment. Harvest the sprouts from the culture devices, soak and rinse in purified water or ion-free water. Optionally, steam cook and peel the sprouts to remove undesirable taste. Then dry and ground the sprouts into a powder form composition for packaging. Alternatively, if soybeans is used in step a, a milk-like extract can be produced by grinding the sprouts with drinking water then filtering out remaining sediment.

d) To produce seedlings as vegetable, allow the seedlings to grow for 3 to 6 days as desired. Remove the seedlings from the culture devices, soak and rinse in tap water or purified water.

In step a, the pH of the saturation solution is adjusted to between 5 and 6. The target trace element concentration and the type of inorganic salt or compound used in the saturation solution are: a 500 to 3000 $\mu g/g$ iron concentration solution of $FeSO_4 \cdot 7H_2O$; or a 5 to 100 $\mu g/g$ selenium concentration solution of $Na_2SeO_3$; or a 50 to 1000 $\mu g/g$ germanium concentration solution of $GeO_2$; or a 500 to 3000 $\mu g/g$ zinc concentration solution of $ZnSO_4 \cdot 7H_2O$; or a 10 to 1000 $\mu g/g$ chromium concentration solution of $CrCl_3 \cdot 7H_2O$; or a mixture of 5 to 100 $\mu g/g$ selenium concentration and 50 to 1000 $\mu g/g$ germanium concentration solution of $Na_2SeO_3$ and $GeO_2$.

The trace element concentration, volume and the pH of the saturation solution and the length of the saturation process are essential to the successful germination of the seeds and the desirable level of organic trace element content in the sprouts and seedlings. If these parameters fall out side the above specified range, it may hinder the germination or reduce the nutritional value of the product.

The types of seeds may be used in this invention include soybeans, black beans, red beans, green beans, daikon seeds, wheat and any other types of plant seeds that suit the needs of the desired diet or the particular manufacturing process. Similarly, although this invention focused on five trace elements, other types of trace elements essential to human health are also applicable.

Post-process data were collected using the powder form composition. The data shows the trace element content in the powder after the enrichment process is significantly higher than that of before. The organic form trace elements content in the powder after the enrichment process is also much higher than that of inorganic form trace elements. Further, the trace element content in the powder is roughly proportional to the trace element concentration of the saturation solution used in step a and b.

EXAMPLE 1

Soybeans are used to produce the powder form composition enriched separately with zinc, iron, selenium, germanium and chromium. The result of the process is shown in Table I below.

TABLE I

|  | Zinc | | | Iron | | | Selenium | | | Germanium | | Chromium (III) | | |
|---|---|---|---|---|---|---|---|---|---|---|---|---|---|---|
| Solution ($\mu$g/g) | 600 | 1000 | 2000 | 1000 | 1500 | 2000 | 10 | 50 | 75 | 500 | 750 | 250 | 500 | 750 |
| Seeds ($\mu$g/g) |  | 26.5 |  |  | 57 |  |  | 0.0583 |  |  | 4.6 |  | 2.6 |  |
| Powder ($\mu$g/g) | 540 | 900 | 1490 | 800 | 1250 | 1500 | 8.9 | 35 | 57.6 | 224 | 432 | 147 | 290 | 540 |

EXAMPLE 2

Black beans are used to produce the powder form composition enriched separately with zinc, iron, selenium and chromium. The result of the process is shown in Table II below.

TABLE II

|  | Zinc | | Iron | | | Selenium | | | Chromium (III) | | |
|---|---|---|---|---|---|---|---|---|---|---|---|
| Solution ($\mu$g/g) | 1000 | 2000 | 1000 | 1500 | 2000 | 10 | 50 | 75 | 250 | 500 | 750 |
| Seeds ($\mu$g/g) | 46 |  |  | 72 |  |  | 0.0086 |  |  | 1.6 |  |
| Powder ($\mu$g/g) | 920 | 2020 | 870 | 1500 | 2600 | 7.73 | 26 | 52.8 | 99 | 270 | 550 |

EXAMPLE 3

Green beans are used to produce the powder form composition enriched separately with zinc, iron, selenium, germanium and chromium. The result of the process is shown in Table III below.

TABLE III

|  | Zinc | | | Iron | | | Selenium | | | Germanium | | Chromium (III) | | |
|---|---|---|---|---|---|---|---|---|---|---|---|---|---|---|
| Solution ($\mu$g/g) | 600 | 1000 | 2000 | 1000 | 1500 | 2000 | 10 | 50 | 75 | 500 | 750 | 250 | 500 | 750 |
| Seeds ($\mu$g/g) |  | 24 |  |  | 37 |  |  | 0.0605 |  |  | 4.67 |  | 4.17 |  |
| Powder ($\mu$g/g) | 540 | 740 | 1400 | 850 | 1450 | 1900 | 9 | 26 | 52.3 | 340 | 581 | 150 | 310 | 470 |

EXAMPLE 4

Soybeans are used to obtain the organic conversion rate of zinc and selenium. Add 1 gram of the powder form composition in 99 ml distill water and place the mixture in a 12,000 rpm electronic agitator to thoroughly break down the cell wall. Use a microscope to verify that more than 95% of the cell walls are broken down. Then pour 100 ml of the mixture in a dialysis bag and place the bag in a 250 ml ion-free water environment to dialyze in low temperature for at least 48 hours. The total zinc (or selenium) content in the powder minus the zinc ion content in the dialysis solution equals the amount of zinc in the powder in organic form. The result is shown in Table IV below.

TABLE IV

|  | Selenium | | Zinc | | |
|---|---|---|---|---|---|
| Sample Code | 372A | 372B | 372C | 2005 | 372D |
| Total ($\mu$g/g) | 8.9 | 48.0 | 492 | 1250 | 2370 |
| Inorganic ($\mu$g/g) | 0.11 | 5.25 | 147 | 277 | 371 |
| Organic ($\mu$g/g) | 8.8 | 42.7 | 345 | 970 | 2000 |
| Organic/Total (%) | 98.8 | 89.0 | 70.1 | 77.9 | 84.4 |

I claim:
1. A process of producing nutritional supplements rich in organic trace elements using soilless culture of plant sprouts and seedlings comprising the steps of:

a. saturating the selected seeds before germination in an inorganic salt solution of the target trace element for 4 to 6 hours;

b. placing the saturated seeds in a soilless culture environment to germinate using tap water or purified water as initial moisture and spraying the same seed saturation solution onto the sprouts and seedlings twice a day thereafter;

c. harvesting the sprouts after 1 to 2 days when they reach 1 to 1.5 cm in height followed by rinsing, steaming, peeling, and producing a powder form composition by drying and grinding the sprouts, or if soybeans is used in step a, producing a milk-like extract by grinding the sprouts with water and filtering out remaining sediment d. producing seedlings as vegetable by allowing the seedlings to grow for 3 to 6 days and harvesting the young seedlings before they reach full maturity.

2. The process according to claim 1, wherein the seed saturation solution for enriching iron is a 500 to 3000 μg/g iron concentration inorganic salt solution.

3. The process according to claim 1, wherein the seed saturation solution for enriching selenium is a 5 to 100 μg/g selenium concentration inorganic salt solution.

4. The process according to claim 1, wherein the seed saturation solution for enriching germanium is a 50 to 1000 μg/g germanium concentration inorganic salt solution.

5. The process according to claim 1, wherein the seed saturation solution for enriching zinc is a 500 to 3000 μg/g zinc concentration inorganic salt solution.

6. The process according to claim 1, wherein the seed saturation solution for enriching chromium is a 10 to 1000 μg/g chromium (III) concentration inorganic salt solution.

7. The process according to claim 1, wherein the seed saturation solution for enriching both selenium and germanium is a mixture of 5 to 100 μg/g selenium concentration and 50 to 1000 μg/g germanium concentration inorganic salt solution.

8. The process according to claim 1, wherein the target trace element(s) concentration in the sprouts and seedlings can be effectively controlled by regulating the concentration of the same trace element(s) in the seed saturate solution of step a.

9. The process according to claim 1 wherein step c can alternatively produce seedlings as vegetables by allowing the seedlings to grow for 3 to 6 days and harvesting the young seedlings before they reach full maturity.

* * * * *